March 14, 1939.  O. EPPENSTEIN  2,150,544

DEVICE FOR DEVIATING A PENCIL OF LIGHT RAYS.

Filed Aug. 16, 1938

Inventor:

Otto Eppenstein

Patented Mar. 14, 1939

2,150,544

UNITED STATES PATENT OFFICE 2,150,544

DEVICE FOR DEVIATING A PENCIL OF LIGHT RAYS

Otto Eppenstein, Jena, Germany, assignor, by mesne assignments, to Bausch & Lomb Optical Company, Rochester, N. Y., a corporation of New York Application August 16, 1938, Serial No. 225,194
In Germany September 9, 1937

2 Claims. (Cl. 88—1)

This application has been filed in Germany September 9, 1937.

Small angles are frequently measured by means of optical instruments having a system of wedge-shaped prisms of continuously variable deviation. The invention concerns that constructional form of such systems which is known by the name of rotating-wedge compensator and composed of two deviating prisms rotatable in opposite senses about a common axis. When these two prisms have a definite reciprocal position, the resulting deviation is zero, because the prisms have the same angles of refraction. The greatest resulting deviation corresponds to twice the deviation of a single prism. If $\delta^0$ be the deviation to which this prism submits a pencil of light rays incident at approximately right angles, $\delta$ the deviation due to the entire system, and $\varphi$ the angle between the refracting edges of the two prisms, the following equation is obtained:

(1) $$\delta = 2\delta^0 \cos \frac{\varphi}{2}$$

The resulting deviation is, accordingly, proportional to the function of the cosine of the half angle between the refracting edges. This fact entails, however, a considerable disadvantage of the rotating-wedge compensator, since the resulting deviation is very often required to change in proportion to the mechanical displacements determining it.

This disadvantage can be avoided by proceeding from the idea to make the deviation $\delta$ proportional to the change in the position of a mechanical element rotating the two prisms, which is possible, according to the invention, by providing the rotating-wedge compensator with two stops which include the same angles with the line bisecting the angle between the two refracting edges and are equidistant from the axis of rotation and fixed to the prisms, and with a pushing body which is displaceable parallel to the said bisecting line and touches the two stops with a surface at right angles to the bisecting line. By providing that the distance of the stops from the axis of rotation can be changed, the additional advantage is obtained that the ratio of transmission between the pushing body and the prism system can be varied without the desired proportionality of the displacements being interfered with.

Figure 1:
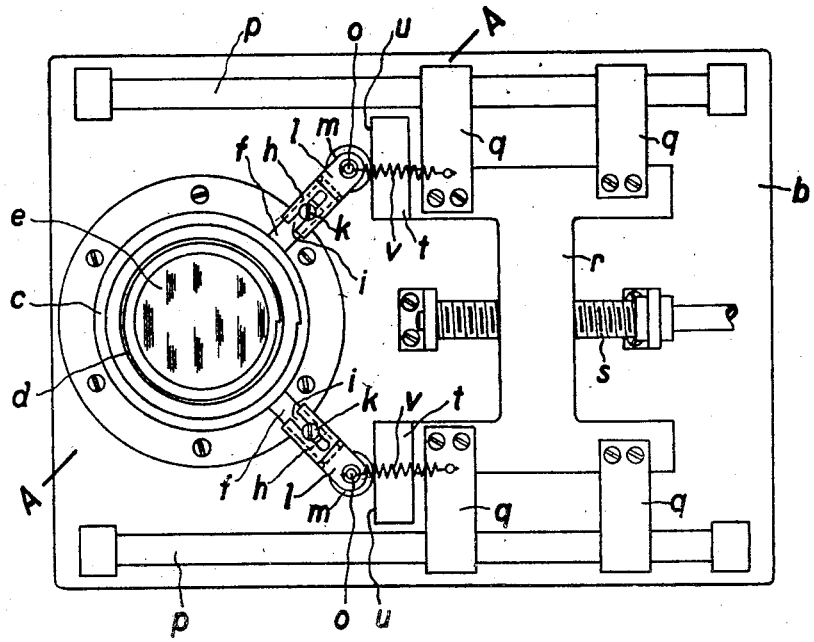
Figure 2:
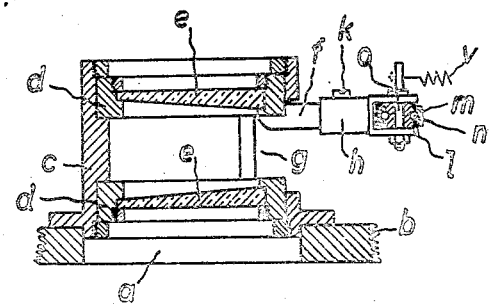

In the accompanying drawing, which illustrates the invention, Figure 1 is the top view of a constructional example and Figure 2 a section through the line A—A in Figure 1.

To an aperture $a$ in a base plate $b$ is screwed a compensator tube $c$ in which are rotatably disposed the mounts $d$ of two equal deviating prisms $e$ in the form of wedges. Each mount $d$ has an arm $f$ extending radially through an opening $g$ of the tube $c$. A sleeve $h$ having a slit $i$ is fixed to the arm $f$ by means of a clamping screw $k$. The sleeve $h$ terminates in a fork $l$ in which a ring $m$ is rotatable on balls $n$ about a bolt $o$ parallel to the axis of rotation of the prisms $e$. The plate $b$ has two rods $p$ which are parallel to the line bisecting the angle between the two arms $f$ and constitute guides for slides $q$ carrying a pushing body $r$ displaceable parallel to the bisecting line. This pushing body $r$ is operated by a threaded spindle $s$ and provided with parts $t$ the surfaces $u$ of which lie in a plane at right angles to the bisecting line. The bolts $o$ are connected to the body $r$ by tension springs $v$.

If $x$ be the effective length of the arms $f$, viz. the distance of the axes of the bolts $o$ from the axis of rotation of the prisms, and $y$ the distance of the plane at right angles to the bisecting line and containing the axes of the bolts $o$ (2) $$\cos \frac{\varphi}{2} = \frac{y}{x}$$

By introducing this magnitude into the Equation (1), there is obtained (3) $$\delta = 2\delta^0 \frac{y}{x}$$

the resulting deviation $\delta$ being, accordingly, proportional to that position of the pushing body $r$ which is represented by the distance $y$ and inversely proportional to the effective length of the arms $f$.

To rotations of the spindle $s$ about the same angles correspond equal variations of the deviations effected by the rotating-wedge compensator, and the ratio of transmission between the drive of the spindle $s$ and the changes in deviation can be varied continuously by changing the effective length of the arms $f$.

I claim:

1. A device for deviating a pencil of light rays at a variable angle, this device comprising a housing, two glass wedges mounted in said housing for rotation about a common axis, the refracting edges of said wedges crossing said common axis of rotation, two arms, each of said arms being fast with one of said glass wedges, two rollers, each of said rollers being rotatable about an axis in one of said arms, the axes of rotation of said rollers being parallel to and equidistant from the axis of rotation of said wedges, the two planes containing the axis of rotation of said wedges and the axes of rotation of said rollers including equal and opposite angles with the refracting edges of said wedges, respectively, a pushing body disposed on said housing, and means for displacing said pushing body parallel to a straight line at right angles to the axis of rotation of said wedges and parallel to the plane bisecting the angle included between the planes determined by the axes of rotation of said rollers and the axis of rotation of said wedges, said rollers being in contact with a surface of said pushing body, said surface being plane and at right angles to said straight line.

2. In a device according to claim 1, two sleeves, each of said sleeves being disposed on one of said arms and displaceable parallel to a line at right angles to the axis of rotation of said wedges, said rollers being rotatably mounted on one of said sleeves.

OTTO EPPENSTEIN.